(12) United States Patent
Tailliet

(10) Patent No.: US 8,943,254 B2
(45) Date of Patent: Jan. 27, 2015

(54) CONVERSION OF A SINGLE-WIRE BUS COMMUNICATION PROTOCOL

(75) Inventor: François Tailliet, Fuveau (FR)

(73) Assignee: STMicroelectronics (Rousset) SAS, Rousset (FR)

(*) Notice: Subject to any disclaimer, the term of this patent is extended or adjusted under 35 U.S.C. 154(b) by 418 days.

(21) Appl. No.: 13/291,250

(22) Filed: Nov. 8, 2011

(65) Prior Publication Data

US 2012/0124258 A1 May 17, 2012

(30) Foreign Application Priority Data

Nov. 15, 2010 (FR) ..................................... 10 59380

(51) Int. Cl.
- *G06F 13/36* (2006.01)
- *G06F 13/42* (2006.01)
- *G06F 11/30* (2006.01)

(52) U.S. Cl.
CPC ................................. *G06F 13/4295* (2013.01)
USPC ............ 710/306; 710/105; 710/106; 713/340

(58) Field of Classification Search
USPC ................. 710/105–106, 306, 311, 313–315; 713/300, 320, 340
See application file for complete search history.

(56) References Cited

U.S. PATENT DOCUMENTS

| | | | |
|---|---|---|---|
| 4,357,634 A * | 11/1982 | Chung | ............................. 360/40 |
| 4,907,222 A | 3/1990 | Slavik | |
| 5,140,611 A | 8/1992 | Jones et al. | |
| 5,363,405 A | 11/1994 | Hormel | |
| 6,256,689 B1 * | 7/2001 | Khosrowpour | ................ 710/300 |
| 7,636,806 B2 | 12/2009 | Furtner | |
| 2004/0189502 A1 | 9/2004 | Lee | |
| 2005/0228929 A1 * | 10/2005 | Penton et al. | .................. 710/306 |
| 2006/0153326 A1 * | 7/2006 | Choi | .............................. 375/360 |
| 2009/0024865 A1 * | 1/2009 | Fugaro et al. | .................. 713/600 |

(Continued)

FOREIGN PATENT DOCUMENTS

| | | |
|---|---|---|
| EP | 0 134 174 A1 | 3/1985 |
| EP | 0798901 | 10/1997 |
| FR | 2 550 901 A1 | 2/1985 |

(Continued)

OTHER PUBLICATIONS

"DS2480B Serial to 1-Wire Line Driver". Maxim Integrated Products, Inc. May 2010.*

(Continued)

*Primary Examiner* — Thomas J Cleary
(74) *Attorney, Agent, or Firm* — Seed IP Law Group PLLC

(57) ABSTRACT

A method of transmission-reception over a serial bus placed, when idle, in a first state at a first voltage, including: a transmit circuit capable of coding a transmission according to a first protocol in which the respective states of the bits are conditioned by time periods of fixed levels, indifferently in the first state or in a second state at a second voltage smaller than the first one; a receive circuit capable of interpreting a communication according to the first protocol; and a protocol converter, interposed between the bus and the transmit and receive circuits, to convert the signals to be transmitted to a second protocol in which the respective states of the bits are conditioned by respective time periods of fixed levels in the first state, and to convert the received signals from the second protocol to the first protocol.

15 Claims, 3 Drawing Sheets

(56) References Cited

U.S. PATENT DOCUMENTS

2009/0070506 A1* 3/2009 Furtner .................. 710/110
2010/0017553 A1* 1/2010 Laurencin et al. ............ 710/307

FOREIGN PATENT DOCUMENTS

| GB | 2 072 467 A | 9/1981 |
| JP | 62-222730 A | 9/1987 |
| WO | WO 2010010278 | 1/2010 |

OTHER PUBLICATIONS

French Search Report and Written Opinion dated May 23, 2011 from corresponding French Application No. 10/59380.

* cited by examiner

CONVERSION OF A SINGLE-WIRE BUS COMMUNICATION PROTOCOL

CROSS REFERENCE TO RELATED APPLICATIONS

This application claims the priority benefit of French patent application number 10/59380, filed on Nov. 15, 2010, entitled CONVERSION OF A SINGLE-WIRE BUS COMMUNICATION PROTOCOL, which is hereby incorporated by reference to the maximum extent allowable by law.

BACKGROUND OF THE INVENTION

1. Field of the Invention

The present invention generally relates to communications between electronic circuits and, more specifically, to the transmission of digital data in a master-slave system. The present invention more specifically applies to communications over a so-called open-drain or open-collector bus (according to the MOS or bipolar technology), conveying both data and the power supply of the slave circuit(s).

2. Discussion of the Related Art

In an open-drain (or open-collector) bus, the data conductor of the bus is, in the idle state, at a voltage different from ground (generally, a positive voltage). The data are coded and then transmitted by pulling of the bus to ground according to a pre-established coding enabling the receiver to decode the data.

In a single-wire bus protocol to which the present invention more specifically applies, a single communication wire (in addition to a common reference or ground) is used. The signal transmitted over this bus is used as both a synchronization and a data signal. Further, the signal may also be used to power the slave circuit.

In the idle state, such a bus is pulled by default to the high state with a non-zero impedance and the different circuits (master or slave) pull the bus to zero by means of a transistor connected to a lower level (generally the ground) to code the transmitted data.

An example of a system of communication over a single-wire bus of this type is described in U.S. Pat. No. 7,636,806. According to the communication protocol described in this document, the data coding is performed according to periods of fixed levels separating two state switchings. The bits at state 1 (high) are coded by periods having a longer duration that the bits at state (low), each transition between the high state and the low state indicating a bit change even if the bit state remains the same.

Such a communication protocol operates properly if the slave circuit has its own power supply source. However, in many cases, slave circuits draw their power supply from the bus. The power recovery is then not optimal. Indeed, in average, the bus will only be in the high state capable of providing a power supply to the slave circuits for half of the transmission.

SUMMARY OF THE INVENTION

An embodiment overcomes all or part of the disadvantages of known systems of communication over an open-drain (or open-collector) bus.

Another embodiment provides master and slave circuits capable of automatically adapting the communication protocol according to whether the slave circuit has or not an autonomous power supply.

Another embodiment provides a system compatible with the master and slave circuits equipped with processing circuits of a protocol according to which the data coding is performed according to time periods of fixed levels separating two state switchings.

Another embodiment provides a system capable of operating both according to a protocol such as described in the above-mentioned document and according to a protocol optimizing the power transfer.

Thus, an embodiment provides a method of transmission-reception over a serial bus placed, when idle, in a first state at a first voltage, comprising:

a transmit circuit capable of coding a transmission according to a first protocol in which the respective states of the bits are conditioned by time periods of fixed levels, indifferently in the first state or in a second state at a second voltage smaller than the first one;

a receive circuit capable of interpreting a communication according to the first protocol; and a protocol converter, interposed between the bus and the transmit and receive circuits, to convert the signals to be transmitted to a second protocol in which the respective states of the bits are conditioned by respective time periods of fixed levels in the first state, and to convert the received signals from the second protocol to the first protocol.

According to an embodiment, the device is capable of activating or deactivating the protocol converter according to the type of transmission desired over the bus.

According to an embodiment, said converter is activated when the device extracts its power supply from the bus.

According to an embodiment, said converter is activated when another device with which it communicates over the bus extracts its power supply from the bus.

According to an embodiment, the converter comprises:

a first stage of conversion from the first protocol to the second one having an input connected to the output of the transmit circuit;

a second stage of conversion from the second protocol to the first one having an input connected to the bus;

a first two-to-one multiplexer having inputs respectively connected to an output of the transmit circuit and to an output of the first conversion stage, and having an output controlling a switch conditioning the state of the bus; and a second two-to-one multiplexer having respective inputs connected to the bus and to an output of the second conversion stage, and having an output connected to an input of the detection circuit.

According to an embodiment, the periods of pulses of the first protocol are respectively equal to the periods of pulses of the second protocol plus an interval in the second state according to the second protocol.

Another embodiment provides a system of communication between a first device and at least one second device over a serial bus, wherein at least one of the devices is in accordance with any of the foregoing claims.

Another embodiment provides a control method, comprising the steps of:

detecting the absence of a power supply voltage originating from a source other than the bus; and activating said conversion circuit.

Another embodiment provides a control method, comprising the steps of:

activating the conversion circuit;

initiating a communication towards said other device; and in the absence of a response:

deactivating the conversion circuit;

initiating the communication again.

The foregoing and other objects, features, and advantages will be discussed in detail in the following non-limiting description of specific embodiments in connection with the accompanying drawings.

DETAILED DESCRIPTION

Figure 1:
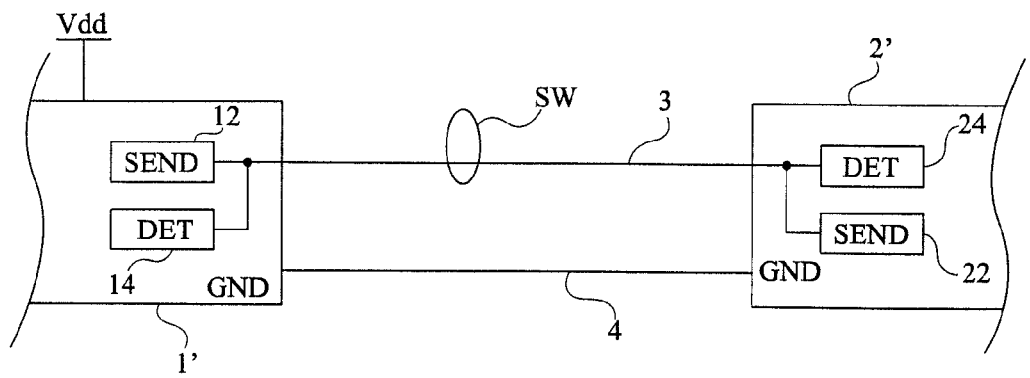
FIG. 1 partially shows in the form of blocks two circuits capable of communicating according to a master-slave protocol over a single-wire bus.

The same elements have been designated with the same reference numerals in the different drawings. For clarity, only those steps and elements which are useful to the understanding of the discussed embodiments will be described. In particular, what use is made of the data in each of the communicating circuits has not been detailed, the described embodiments being compatible with current uses of such data. Further, the circuits for coding the signals to be transmitted by the different communicating circuits towards the desired protocols have not been detailed either, the present invention being here again compatible with usual circuits for coding such signals.

FIG. 1 is a partial block diagram of an embodiment of a single-wire bus communication system. A circuit 1', arbitrarily considered as a master circuit, is capable of communicating according to a single-wire protocol SW with a distant circuit 2' (slave). Circuits 1' and 2' are connected by a wire 3 forming the single-wire bus and share the same reference potential (connection 4—ground GND). Each circuit 1', 2', for example, comprises a transmit circuit (SEND) 12, respectively 22, and a receive circuit (DET) 14, respectively 24. For a communication from circuit 1' to circuit 2', circuit 1' imposes, via its transmit circuit 12, a signal over bus 3. For a communication from circuit 2' to circuit 1', circuit 2' imposes a signal over bus 3 via its transmit circuit 22. The circuit which causes the transmission imposes the clock over the bus. As a variation, the master circuit always imposes the clock.

It being an open-drain (or open-collector) bus, wire 3 of the bus is, in the idle state, at a high level, typically pulled to power supply voltage Vdd by an impedance (not shown in FIG. 1). Each circuit 1' or 2' intending to communicate data to the other modulates the signal over the bus by pulling said bus to a level lower than the high level, typically by pulling this bus to ground.

In the example of FIG. 1, independently from the communication, master circuit 1' powers slave circuit 2', only the master circuit receiving a power supply voltage Vdd. Slave circuit 2' draws its power supply from a regulation of the signal present over the bus.

Figure 2A:
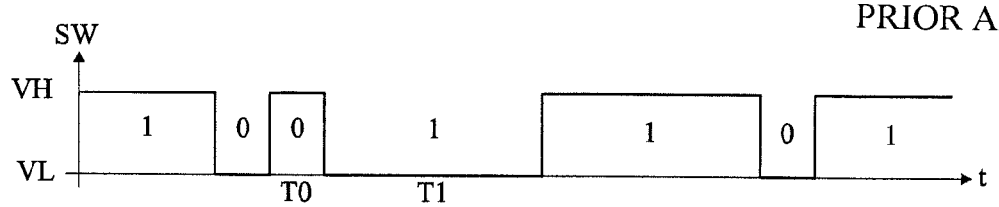
FIG. 2A is a timing diagram illustrating a first communication protocol capable of being used.

FIG. 2A is a timing diagram illustrating a first communication protocol that may be used in the embodiments which will be described. This protocol corresponds to that described in above-mentioned document U.S. Pat. No. 7,636,806.

Bus SW is, at the beginning of a communication, placed at a high level VH approximately corresponding to level Vdd. Actually, the voltage level present on wire 3 corresponds to voltage Vdd minus the voltage drop in an impedance for pulling the bus to the high state. The respective states of the bits to be transmitted are coded by the time periods at high state VH and at a low state VL where the transmit circuit pulls the bus to a voltage VL close to ground. A state 0 is coded by a time period of duration T0. A state 1 is coded by a time period of longer duration T1. The passing from one bit to the next bit is identified by a switching of the bus, that is, a switching from the high state to the low state or conversely. In the example of FIG. 2A, a time slot providing the state of bits 1001101 is assumed.

The receiver is parameterized, for example, in an initialization phase, to be able to recognize durations T0 and T1 and thus to decode the data.

When the master circuit intends to initiate a transmission, it sets the bus to the low level to warn (wake up) the slave circuit(s) connected to the bus. This pulse at the low level during period T0 is followed by a pulse at the high level during period T1. This amounts to successively sending a 0 and a 1. This is a training phase further enabling the slave circuit to determine respective durations T0 and T1. This phase is followed by the transmission of the bits of the transmitted word. Each word transmitted from the master circuit to the slave circuit begins in this way. A word generally ends with a parity bit before the bus is deallocated in the high state.

Conversely, a transmission from a slave circuit to the master circuit starts with a training phase comprising placing the bus in the low level for a time period T1 followed by a pulse of duration T0 in the high level. This training is followed by the transmission of the bits of the word and ends with a parity bit before the bus is deallocated.

Figure 2B:
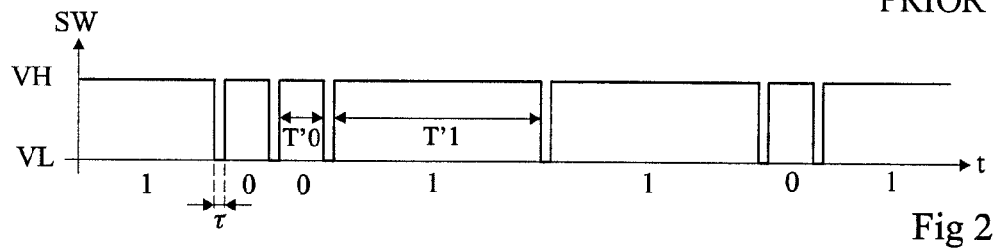
FIG. 2B is a timing diagram illustrating a second communication protocol capable of being used.

FIG. 2B is a timing diagram illustrating the state of bus SW for the transmission of the same states (bits) according to another communication protocol aiming at favoring the power supply of the slave circuit(s). Data transmissions are coded according to the time periods in the high state between two pulses of short duration τ during which the bus is pulled to the low state by one or the other of the circuits connected to the bus. Typically, a "short duration" is such that, during a communication, the bus conductor is in the high state more than half of the time. Preferably, a low pulse has a duration less than one quarter of the minimum duration of a period at the high state. The transmission of a bit at state 0 corresponds to maintaining the bus in the high state for a first time period T0. The transmission of a bit at level 1 corresponds to maintaining the bus in the high state for a different time period T'1 (longer, in the example of FIG. 2B).

According to this protocol, when the master circuit intends to initiate a transmission, an initialization phase (not shown) comprises setting the bus to the low level to warn (wake up) the slave circuit(s) connected to the bus. This start pulse is followed by a period at the high level which ends at the next low-level pulse. This period indicates a reference duration which enables the slave circuit to parameterize a counter that it contains and the respective durations representative of the transmissions of 0s and 1s which will follow.

Such a protocol favors the power supply of the slave circuit which draws its power supply from the signal present over the bus.

Whatever the communication protocol, different conditions in the transmission according to whether it concerns an address, data, a writing into or a reading from the slave circuit, etc. are provided.

Figure 3:
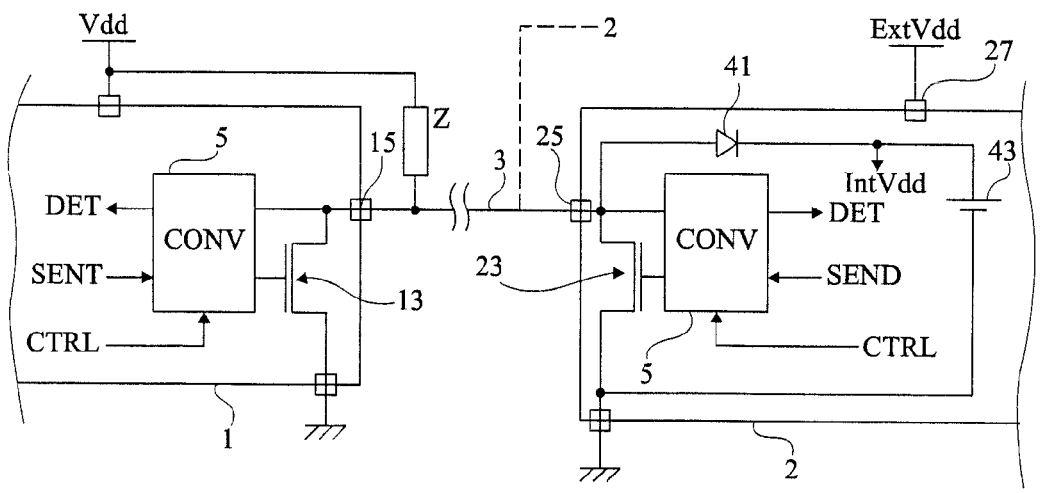
FIG. 3 is a more detailed block diagram of a system according to an embodiment.

FIG. 3 partially shows in the form of blocks an embodiment of a single-wire bus communication system in which master circuits 1 and slave circuits 2 are equipped with protocol converters.

In the example of FIG. 3, a master circuit 1 and a slave circuit 2 are connected by a single-wire bus 3. A pull-up impedance Z connects wire 3 to a terminal of application of voltage Vdd. In practice, the bus power supply is conditioned by the master circuit to avoid unnecessary power consumption. A single slave circuit 2 has been illustrated. However, other slave circuits may be connected to the bus, as illustrated by the dotted line in FIG. 3.

Each circuit 1 and 2 comprises a switch 13, 23 capable of grounding a terminal, respectively 15 or 25, intended to be connected to bus 3. In practice, switches 13 and 23 are most often made in the form of N-channel MOS transistors, which is why reference is made to an open-drain serial bus (or to an open collector if they are formed of bipolar transistors).

In the example of FIG. 3, the slave circuit is capable of drawing its power supply IntVdd from the signal present over the bus. A rectifying element (symbolized by a diode 41) then connects terminal 25 to a power storage element 43, for example, a capacitor or a battery. Element 43 then powers, possibly after regulation of voltage IntVdd, the different internal circuits of slave circuit 2. In certain cases, slave circuit 2 comprises a terminal 27 capable of receiving an external power supply voltage ExtVdd. This voltage is called external because it does not come from bus 3. It may be a battery integrated to the actual slave device.

A protocol conversion circuit 5 (CONV) equips each of circuits 1 and 2. This circuit is interposed between terminal 15, respectively 25, and transmit and detection circuits SEND and DET of the master and slave circuits, and controls switch 13, respectively 23. The function of converter 5 is to convert a communication according to the protocol of FIG. 2A into a transmission over the bus according to the protocol of FIG. 2B. Detectors DET and transmitters SEND correspond to circuits (for example, of the type of circuits 14, 24 and 12, 22 of FIG. 1), enabling each circuit to code/decode data according to the protocol of FIG. 2A. As a variation, if one of the circuits (its detector and transmitter) is capable of directly processing the protocol of FIG. 2B, the converter can be omitted.

Conversion circuits 5 are controlled by signals CTRL originating from the processing circuits equipping the master and slave circuits, which have not been detailed in the drawings. Signal CTRL is a signal for activating or deactivating the converter.

According to a preferred embodiment, this enables each device to be configured in transmit mode according to protocol 2A or 2B, for example, according to whether the slave circuit must or not be powered over the bus.

Thus, both the communication and the power supply of the slave circuit(s) are optimized, and advantage is taken of the respective advantages of the two protocols according to the system situation.

Among others, in a communication according to protocol 2B:
resetting the slave circuits which are powered over the bus is easy by pulling the bus to zero, which suppresses any power supply;
the consumption is decreased since the periods when the bus is pulled to zero are shorter; and
the slave circuit needs no large power storage capacity since periods with no power supply from the bus are short.

Conversely, when the slave circuit has its own power source and the communication is performed according to protocol 2A:
constraints in terms of consumption and of transmission speed are decreased; and
the number of transitions over the bus is decreased, which decreases electromagnetic disturbances generated by the transmission.

Having master and slave device capable of automatically switching from one protocol to the other by means of a simple conversion circuit is thus particularly advantageous.

Figure 4:
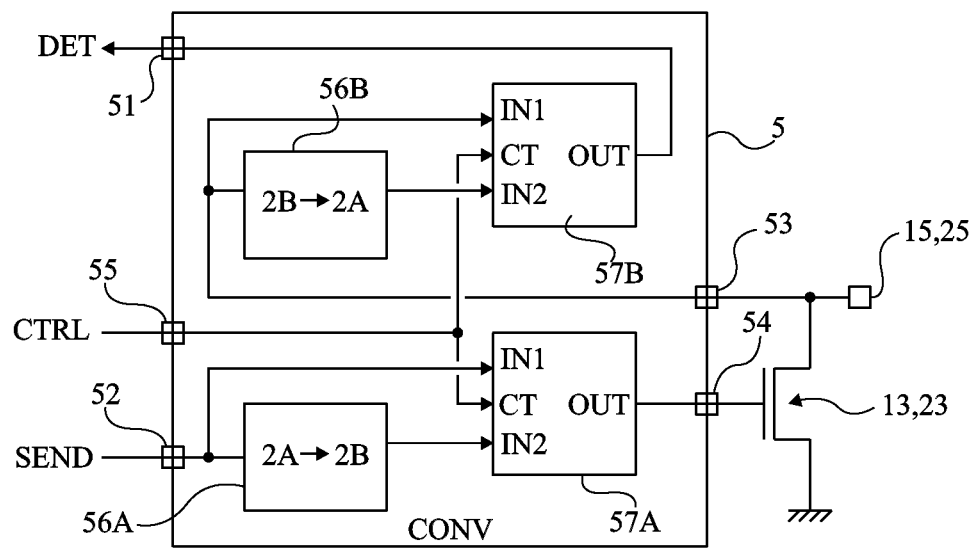
FIG. 4 shows an embodiment of a converter capable of equipping master and slave circuits of the system of FIG. 3.

FIG. 4 is a simplified block diagram of an embodiment of a conversion circuit 5. This circuit comprises two terminals 51 and 52 intended to be respectively connected to detection and transmit circuits DET and SEND of the master device 1 or the slave device 2 to which it is integrated, a terminal 53 intended to be connected to bus 3 (to terminal 15, respectively 25, of device 1, respectively 2), a terminal 54 intended to be connected to the control terminal (for example, the gate) of switch 13, respectively 23, and a terminal 55 intended to receive control signal CTRL.

Circuit 5 comprises a stage 56A of conversion from protocol 2A to protocol 2B and a stage 56B of conversion from protocol 2B to protocol 2A. Each stage 56A, 56B is associated with a two-to-one selector or multiplexer 57A, 57B, controlled by signal CTRL. Thus, terminal 52 is connected, on the one hand directly to a first input IN1 of multiplexer 57A and, on the other hand, via stage 56A, to second input IN2 of this multiplexer. Output terminal OUT of multiplexer 57A is connected to terminal 54 to control, with or without conversion according to the input selected by signal CTRL applied to control terminal CT of multiplexer 57A, switch 13, respectively 23. Further, terminal 53 is connected, on the one hand directly to a first input IN1 of multiplexer 57B and, on the other hand, via stage 56B, to second input IN2 of this multiplexer. Output terminal OUT of multiplexer 57B is connected to terminal 51 to provide, with or without conversion according to the input selected by signal CTRL applied to control terminal CT of multiplexer 57B, the state of bus 3 to detector DET.

The description of FIG. 4 is functional and the converter may, in practice, be made in hardware or software fashion.

Figure 5:
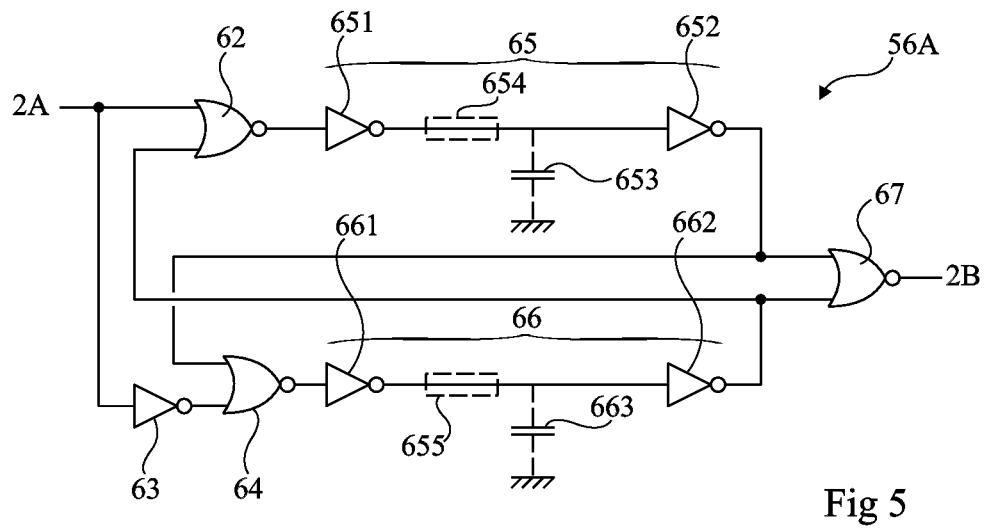
FIG. 5 is an embodiment of a circuit of conversion from the protocol of FIG. 2A to the protocol of FIG. 2B.

FIG. 5 shows an embodiment of a stage 56A of conversion from protocol 2A to protocol 2B. A signal set up according to protocol 2A is applied at the input of a flip-flop circuit having the function of generating two non-overlapping phases at one. For example, terminal 52 is directly connected to a first input of a NOR gate 62 and, via an inverter 63, to a first input of a NOR gate 64. The respective outputs of gates 62 and 64 cross two delay circuits 65 and 66 before being, on the one hand connected to the respective inputs of a NOR gate 67 and, on the other hand connected to the second input of the other gate, respectively 64 or 62. Delay circuits 65 and 66 are, in a simplified embodiment, formed of several inverters 651, 652 in series, respectively 661 and 662. Two inverters in series having their junction point grounded by a capacitive element 653, respectively 663, may also be provided, or a resistive element 654, respectively 655, may be interposed between the two inverters. The presence of inverter 652 or 662 enables, especially in the case of a simultaneous use of passive components, setting back up the signal before sending it to gate 67.

The duration set by delay lines 65 and 66 conditions the duration of pulse t in the low state of protocol 2B.

Figure 6:
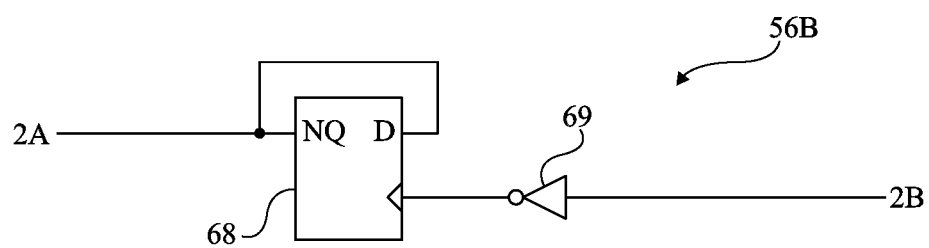
FIG. 6 is an example of a circuit of conversion from the protocol of FIG. 2B to the protocol of FIG. 2A.

FIG. 6 shows an embodiment of a stage 56B of conversion from protocol 2B to protocol 2A. According to this embodiment, a counter dividing the frequency by two is formed based on a D-type flip-flop 68 having its clock input receiving the signal according to protocol 2B, inverted by an inverter 69, and having its inverted output NQ looped back onto data input D. Output NQ defines the output of the stage of conversion to the format of protocol 2A. The flip-flop of course comprises usual function set and reset inputs.

The conversion stages are provided to respect the communication rate. In other words, durations T0 and T'0 and durations T1 and T'1 only differ by duration $\tau$ (T'0+$\tau$=T0 and T'1+$\tau$=T1).

Different configurations are possible, the most advanced comprising the provision of conversions in both directions on the master and slave circuit sides. Thus, the concerned slave or master device is capable of transmitting or of receiving data on one or the other of the protocols according to its configuration.

Simplified versions may be provided, for example, in the case of a slave circuit having no possibility of external power supply. A systematic conversion of the protocol may then be provided so that the signal present over the bus respects protocol 2B and that the detections and transmit circuits of the master and slave devices interpret protocol 2A.

Figure 7:
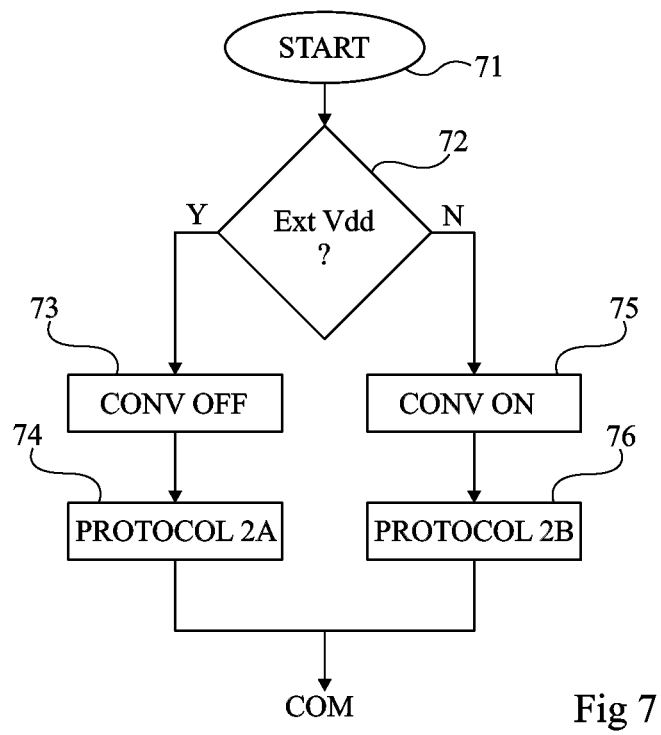
FIG. 7 is a simplified example of an embodiment of a method for selecting the operating mode on the slave circuit side.

FIG. 7 is a simplified flowchart illustrating an example of selection of protocol 2A or 2B by the slave circuit. When the circuit is woken up (block 71, START), the internal circuits of slave device 2 test the presence of an external power supply (block 72, ExtVdd?). In the presence of an external power supply (output Y of block 72), converter 5 is deactivated (block 73, CONV OFF). This means a direct connection (selection of the first inputs of multiplexers 57A and 57B) between the detection and transmit circuits and the bus, the bus being then assumed to transmit data according to protocol 2A (block 74, PROTOCOL 2A). In the absence of an external power supply (output N of block 72), the slave circuit activates its converter (block 75, CONV ON). This means a conversion from the communication protocol to protocol 2B (block 76, PROTOCOL 2B).

As a variation, the slave circuit has no converter, but the microcontroller which generally equips it is capable of coding and interpreting the signals of the bus according to both protocols. Only the master circuit is then equipped with a converter to adapt its transmission according to the slave.

Figure 8:
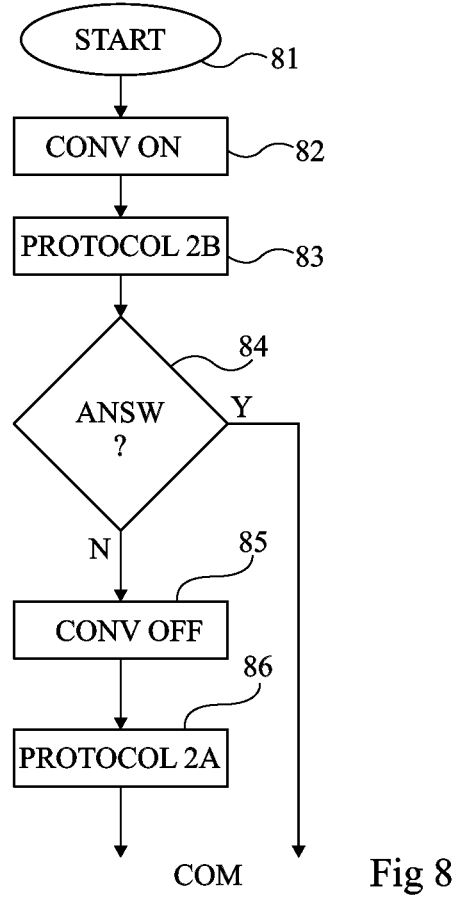
FIG. 8 is a timing diagram illustrating an embodiment of a method for selecting the protocol on the master circuit side.

FIG. 8 is a simplified flowchart illustrating the control of the converter on the master circuit side. When it desires to initiate a communication (block 81, START), the master circuit activates its converter (block 82, CONV ON). Its converter then transforms a transmission according to protocol 2A into an effective transmission according to protocol 2B (block 83, PROTOCOL 2B). The master device monitors whether it receives a response from the slave circuit (block 84, ANSW?). If it does (output Y of block 83), this means that the slave circuit has automatically switched to a mode of power supply from the bus (protocol 2B) and the master circuit carries on the communication (COM) based on this protocol. If not (output N of block 84), this means that the slave circuit has its own power supply or, at least, that it has remained switched on protocol 2A and that its converter is inactive. The master circuit then deactivates its converter (block 85, CONV OFF) and switches onto a transmission according to protocol 2A (block 86, PROTOCOL 2A).

Preferably, an operation according to protocol 2A holds the priority, that is, when it is made possible by a battery power supply of the slave circuit, this protocol is maintained. A switching to protocol 2B is then only activated in the absence of a power supply on the slave circuit side.

Various embodiments have been described, various alterations and modifications will occur to those skilled in the art. In particular, the practical implementation of the described embodiments is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device of transmission-reception over a single-wire serial bus placed, when idle, in a first state at a first voltage, comprising:
    a transmit circuit configured to code a transmission according to a first protocol in which the respective states of bits are conditioned by time periods of fixed levels, in the first state or in a second state at a second voltage smaller than the first voltage;
    a receive circuit configured to interpret a communication according to the first protocol; and
    a protocol converter, connected to the bus and the transmit and receive circuits, configured to convert signals to be transmitted to a second protocol in which respective bit states are conditioned by respective time periods of fixed levels in the first state, and to convert received signals from the second protocol to the first protocol, wherein the protocol converter converts the signals to be transmitted from the first protocol to the second protocol in response to an activated state of a control signal, which indicates that a slave device is powered over the single-wire serial bus, and does not convert the signals to be transmitted to the second protocol in response to a deactivated state of the control signal.

2. The device of claim 1, wherein said protocol converter is activated when another device with which it communicates over the bus extracts its power supply from the bus.

3. A method for controlling the device of claim 2, comprising:
    activating the protocol converter;
    initiating a communication towards said other device; and
    in the absence of a response:
    deactivating the protocol converter and;
    initiating the communication again.

4. The device of claim 1, wherein periods of pulses of the first protocol are respectively equal to periods of pulses of the second protocol plus an interval in the second state according to the second protocol.

5. A method for controlling the device of claim 1, comprising:
    detecting an absence of a power supply voltage originating from a source other than the bus; and
    activating said protocol converter.

6. A system of communication between a first device and at least one second device over the single-wire serial bus, wherein at least one of the devices is in accordance with claim 1.

7. A device of transmission-reception over a single-wire serial bus placed, when idle, in a first state at a first voltage, comprising:
- a transmit circuit configured to code a transmission according to a first protocol in which the respective states of bits are conditioned by time periods of fixed levels, in the first state or in a second state at a second voltage smaller than the first voltage;
- a receive circuit configured to interpret a communication according to the first protocol; and
- a protocol converter, connected to the bus and the transmit and receive circuits, configured to convert signals to be transmitted to a second protocol in which respective bit states are conditioned by respective time periods of fixed levels in the first state, and to convert received signals from the second protocol to the first protocol, wherein the protocol converter comprises:
- a first stage of conversion from the first protocol to the second protocol having an input connected to an output of the transmit circuit;
- a second stage of conversion from the second protocol to the first protocol having an input connected to the single-wire serial bus;
- a first two-to-one multiplexer having inputs respectively connected to the output of the transmit circuit and to an output of the first conversion stage, and having an output controlling a switch conditioning the state of the single-wire serial bus; and
- a second two-to-one multiplexer having respective inputs connected to the single-wire serial bus and to an output of the second conversion stage, and having an output connected to an input of the receive circuit.

8. A device for communication on a single-wire bus, comprising:
- a transmit circuit configured to transmit signals according to a first protocol in which states of bits are indicated by different time periods at a first voltage level or a second voltage level lower than the first voltage level; and
- a protocol converter configured to convert the transmitted signals from the first protocol to a second protocol in response to an active state of a control signal, which indicates that a slave device receives power over the single-wire bus, and to not convert the transmitted signals from the first protocol to the second protocol in response to a deactivated state of the control signal, wherein states of bits in the second protocol are indicated by different time periods at the first voltage level and wherein the protocol converter is connected between the transmit circuit and the single-wire bus.

9. The device of claim 8, wherein the protocol converter comprises:
- a first conversion stage, configured to convert from the first protocol to the second protocol, having an input connected to an output of the transmit circuit;
- a second conversion stage, configured to convert from the second protocol to the first protocol, having an input connected to the single-wire bus;
- a first two-to-one multiplexer having inputs respectively connected to the output of the transmit circuit and to an output of the first conversion stage, and having an output coupled to a switch that controls the state of the single-wire bus; and
- a second two-to-one multiplexer having inputs respectively connected to the single-wire bus and to an output of the second conversion stage, and having an output connected to an input of a receive circuit.

10. The device of claim 8, wherein periods of pulses of the first protocol are respectively equal to periods of pulses of the second protocol plus an interval at the second voltage level according to the second protocol.

11. The device of claim 8, wherein bits of the second protocol are separated by pulses at the second voltage level and wherein the pulses at the second voltage level have durations less than one-quarter of a shortest time period at the first voltage level.

12. A method for communication on a single-wire bus, comprising:
- transmitting signals on the single-wire bus according to a first protocol in response to a deactivated state of a control signal, wherein states of bits according to the first protocol are indicated by different time periods at a first voltage level or a second voltage level lower than the first voltage level; and
- transmitting signals on the single-wire bus according to a second protocol in response to an activated state of the control signal, wherein the states of bits according to the second protocol are indicated by different time periods at the first level and wherein the activated state of the control signal indicates that a slave device receives power over the single-wire bus.

13. The method of claim 12, wherein periods of pulses of the first protocol are respectively equal to the periods of pulses of the second protocol plus an interval at the second voltage level according to the second protocol.

14. The method of claim 12, further comprising transmitting signals to a second device on the single-wire bus according to the second protocol and, in the absence of a response from the second device, transmitting signals to the second device on the single-wire bus according to the first protocol.

15. The method of claim 12, wherein bits of the second protocol are separated by pulses at the second voltage level and wherein the pulses at the second voltage level have durations less than one-quarter of a shortest time period at the first voltage level.

* * * * *